(12) United States Patent
Kani et al.

(10) Patent No.: US 11,335,930 B2
(45) Date of Patent: May 17, 2022

(54) FUEL CELL SYSTEM AND METHOD FOR OPERATING THE SAME

(71) Applicant: Panasonic Intellectual Property Management Co., Ltd., Osaka (JP)

(72) Inventors: Yukimune Kani, Osaka (JP); Yuichi Mikami, Kyoto (JP); Takeshi Terayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/384,467

(22) Filed: Apr. 15, 2019

(65) Prior Publication Data

US 2019/0363377 A1 Nov. 28, 2019

(30) Foreign Application Priority Data

May 25, 2018 (JP) .............................. JP2018-100375

(51) Int. Cl.
*H01M 8/04* (2016.01)
*H01M 8/04858* (2016.01)
(Continued)

(52) U.S. Cl.
CPC ....... *H01M 8/0491* (2013.01); *H01M 8/0432* (2013.01); *H01M 8/04126* (2013.01);
(Continued)

(58) Field of Classification Search
CPC ......... H01M 8/04074; H01M 8/04343; H01M 8/04126; H01M 8/04328; H01M 8/04402;
(Continued)

(56) References Cited

U.S. PATENT DOCUMENTS

2002/0182461 A1* 12/2002 Hasuka ............. H01M 8/04179
429/431
2006/0286417 A1 12/2006 Aoyama et al.
(Continued)

FOREIGN PATENT DOCUMENTS

JP 2004-273343 9/2004
JP 2014-024696 2/2014
(Continued)

OTHER PUBLICATIONS

Ahmed, S. and M. Krumpelt. "Hydrogen from hydrocarbon fuels for fuel cells." International Journal of Hydrogen Energy 26 (2001) 291-301 (Year: 2001).*
(Continued)

*Primary Examiner* — Michael L Dignan
(74) *Attorney, Agent, or Firm* — McDermott Will & Emery LLP (57) ABSTRACT

A fuel cell system includes a fuel feeder that supplies fuel, a fuel cell stack that generates power through an electrochemical reaction using air and a hydrogen-containing gas generated from the fuel, a first temperature sensor that senses the temperature of the fuel cell stack, and a controller. The fuel cell stack has a membrane electrode assembly including an electrolyte membrane through which protons can pass, a cathode on one side of the electrolyte membrane, and an anode on the other side of the electrolyte membrane. The controller defines an upper limit of current output from the fuel cell stack on the basis of the temperature of the fuel cell stack, the supply of the fuel, and the hydrogen consumption of the fuel cell stack associated with internal leakage current and keeps the current output from the fuel cell stack at or below the upper limit.

12 Claims, 8 Drawing Sheets

(51) Int. Cl.
- *H01M 8/04119* (2016.01)
- *H01M 8/04082* (2016.01)
- *H01M 8/0432* (2016.01)
- *H01M 8/04746* (2016.01)
- *H01M 8/1004* (2016.01)
- *H01M 8/0438* (2016.01)

(52) U.S. Cl.
CPC ... *H01M 8/04201* (2013.01); *H01M 8/04343* (2013.01); *H01M 8/04388* (2013.01); *H01M 8/04753* (2013.01); *H01M 8/1004* (2013.01)

(58) Field of Classification Search
CPC .............. H01M 8/0618; H01M 8/0491; H01M 8/04089; H01M 8/04365; H01M 8/2465; H01M 8/04746; H01M 8/0432; H01M 8/04268; H01M 2008/1095
See application file for complete search history.

(56) References Cited

U.S. PATENT DOCUMENTS

| | | | | |
|---|---|---|---|---|
| 2008/0220303 | A1* | 9/2008 | Yoshida | H01M 8/04559 429/423 |
| 2009/0136804 | A1* | 5/2009 | Bono | H01M 8/04768 429/423 |
| 2009/0274934 | A1* | 11/2009 | Muramatsu | H01M 8/04007 429/429 |
| 2013/0209903 | A1* | 8/2013 | Otsuka | H01M 8/2428 429/416 |
| 2015/0125769 | A1* | 5/2015 | Lyubovsky | H01M 8/04373 429/419 |
| 2016/0351928 | A1* | 12/2016 | Hoshi | H01M 8/04902 |
| 2018/0006317 | A1 | 1/2018 | Kani et al. | |
| 2019/0140288 | A1* | 5/2019 | Ballantine | H01M 8/04097 |

FOREIGN PATENT DOCUMENTS

| | | |
|---|---|---|
| JP | 2017-145445 | 8/2017 |
| JP | 2018-010860 | 1/2018 |

OTHER PUBLICATIONS

P.M. Biesheuvel and J.J.C. Geerlings. "Thermodynamic analysis of direct internal reforming of methane and butane in proton and oxygen conducting fuel cells." Journal of Power Sources 185 (2008) 1162-1167 (Year: 2008).*

Reddy et al. "Analyzing leakage current in a direct methanol fuel cell." J. Solid State Electrochem. (2018) 22:203-216 (Year: 2018).*

Atsushi NANJO, "Development of Solid Oxide Fuel Cell System at JX Nippon Oil & Energy Corporation", Hydrogen energy system, vol. 37, No. 2 (2012), pp. 120-123, Jun. 2012.

A. D Tevebaugh et al., "Carbon Deposition Boundaries in the CHO System at Several Pressures", J. Chem. Eng. Data, vol. 10, No. 4, pp. 359-362, Oct. 1965.

* cited by examiner

FUEL CELL SYSTEM AND METHOD FOR OPERATING THE SAME

BACKGROUND

1. Technical Field

The present disclosure relates to a fuel cell system including a fuel cell stack in which a proton-conducting electrolyte membrane is used and a method for operating the fuel cell system.

2. Description of the Related Art

Fuel cells, which convert chemical energy directly into electric energy by electrochemical reactions, can potentially be of high efficiency in principle because they are not limited by Carnot efficiency. For this reason, fuel cells are expected to become more widespread.

Fuel cells can be affected in performance by their own operation, and various efforts have been made to limit such an operation-related loss of performance. For example, Japanese Unexamined Patent Application Publication No. 2018-10860 discloses a fuel cell system with reduced coking-related loss of performance.

SUMMARY

One non-limiting and exemplary embodiment provides a fuel cell system that suffers even less coking. Another such embodiment provides a method for operating this fuel cell system.

In one general aspect, the techniques disclosed here feature a fuel cell system that includes a fuel feeder that supplies fuel, a fuel cell stack that generates power through an electrochemical reaction using air and a hydrogen-containing gas generated from the fuel, a first temperature sensor that senses a temperature of the fuel cell stack, and a controller. The fuel cell stack has a membrane electrode assembly including an electrolyte membrane through which protons can pass, a cathode on a first side of the electrolyte membrane, and an anode on a second side of the electrolyte membrane. The controller defines an upper limit of current output from the fuel cell stack on the basis of the temperature of the fuel cell stack, a supply of the fuel, and hydrogen consumption of the fuel cell stack associated with internal leakage current and keeps the current output from the fuel cell stack at or below the upper limit.

The fuel cell system according to an aspect of the present disclosure offers the advantage of even less coking.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

After extensive research to further reduce coking in fuel cell systems, the inventors found the following.

In a fuel cell stack in which the electrolyte is a proton-conducting oxide, holes or electrons pass through the electrolyte besides the protons generated from hydrogen at the anode. The conduction of holes or electrons produces leakage current inside the electrolyte (internal leakage current). The hydrogen in the anode gas is therefore consumed not only by power generation but also by internal leakage current.

This type of consumption of hydrogen in the anode gas renders the anode gas deficient in hydrogen and rich in carbon, thereby making coking more likely to occur. From this, the inventors noticed that considering the hydrogen consumption associated with internal leakage current will make the prevention of coking more certain. The present disclosure is based on this insight.

EMBODIMENTS

In a first aspect of the present disclosure, a fuel cell system includes a fuel feeder that supplies fuel, a fuel cell stack that generates power through an electrochemical reaction using air and a hydrogen-containing gas generated from the fuel, a first temperature sensor that senses a temperature of the fuel cell stack, and a controller. The fuel cell stack has a membrane electrode assembly including an electrolyte membrane through which protons can pass, a cathode on a first side of the electrolyte membrane, and an anode on a second side of the electrolyte membrane. The controller defines an upper limit of current output from the fuel cell stack on the basis of the temperature of the fuel cell stack, a supply of the fuel, and hydrogen consumption of the fuel cell stack associated with internal leakage current and keeps the current output from the fuel cell stack at or below the upper limit.

This structure keeps the current output from the fuel cell stack at or below an upper limit that also considers the hydrogen consumption of the fuel cell stack associated with internal leakage current. This leads to a further reduction in the carbon deposition in the fuel cell stack.

In a second aspect of the present disclosure, the fuel cell system according to the first aspect may have a structure in which: the fuel cell system further includes an off-gas path, a passage through which off-gas discharged from the anode passes, and a second temperature sensor that senses a temperature of the off-gas; and the controller defines the upper limit of current output from the fuel cell stack on the basis of either the temperature of the fuel cell stack or the temperature of the off-gas, whichever is lower, the supply of the fuel, and the hydrogen consumption of the fuel cell stack associated with internal leakage current to keep the current output from the fuel cell stack at or below the upper limit. This leads to reduced coking in the fuel cell stack and the off-gas path and therefore provides a reduction in efficiency losses in fuel cell systems that include a fuel cell stack and an off-gas path.

In a third aspect of the present disclosure, the fuel cell system according to the first aspect may have a structure in which: the fuel cell system further includes a pressure sensor that senses a pressure of anode gas, a gas that contains at least one of the fuel and the hydrogen-containing gas and is fed to the anode; and the controller defines the upper limit of current output from the fuel cell stack on the basis of the temperature of the fuel cell stack, the supply of the fuel, the pressure of the anode gas, and the hydrogen consumption of the fuel cell stack associated with internal leakage current and keeps the current output from the fuel cell stack at or below the upper limit.

In a fourth aspect of the present disclosure, the fuel cell system according to the third aspect may have a structure in which: the fuel cell system further includes an off-gas path, a passage through which off-gas discharged from the anode passes, and a second temperature sensor that senses a temperature of the off-gas; and the controller defines the upper limit of current output from the fuel cell stack on the basis of either the temperature of the fuel cell stack or the temperature of the off-gas, whichever is lower, the supply of the fuel, the pressure of the anode gas, and the hydrogen consumption of the fuel cell stack associated with internal leakage current and keeps the current output from the fuel cell stack at or below the upper limit.

In this arrangement, even if the pressure of the anode gas fed varies or the fuel cell system is operated under pressurized conditions, the current output from the fuel cell stack is limited on the basis of the sensed pressure. Coking in the fuel cell stack is reduced and therefore so is the coking-related loss of the efficiency of the fuel cell stack.

In a fifth aspect of the present disclosure, the fuel cell system according to any of the first to fourth aspects may further include a reformer that reforms the fuel and generates the hydrogen-containing gas.

In a sixth aspect of the present disclosure, the fuel cell system according to any of the first to fifth aspects may be a fuel cell system that gives an external load a supply of power from the fuel cell stack and that has a structure in which the controller increases the supply of the fuel if the controller determines that the supply of power from the fuel cell stack, which is based on predetermined performance characteristics of the fuel cell stack, will fail to meet a power requirement of the external load. This allows the user to match the supply of power to the power requirement of an external load while limiting the carbon deposition.

In a seventh aspect of the present disclosure, the fuel cell system according to any of the first to fifth aspects may further include a water feeder that supplies water to the fuel cell stack and an evaporator that evaporates the water supplied from the water feeder.

In an eighth aspect of the present disclosure, the fuel cell system according to the seventh aspect may be a fuel cell system that gives an external load a supply of power from the fuel cell stack and that has a structure in which the controller increases at least one of the supply of the fuel and a supply of the water if the controller determines that the supply of power from the fuel cell stack, which is based on predetermined performance characteristics of the fuel cell stack, will fail to meet a power requirement of the external load. This allows the user to match the supply of power to the power requirement of an external load while limiting the carbon deposition.

In a ninth aspect of the present disclosure, the fuel cell system according to any of the first to fifth aspects may further include a steam feeder that supplies steam to the fuel cell stack.

In a tenth aspect of the present disclosure, the fuel cell system according to the ninth aspect may be a fuel cell system that gives an external load a supply of power from the fuel cell stack and that has a structure in which the controller increases at least one of the supply of the fuel and a supply of the steam if the controller determines that the supply of power from the fuel cell stack, which is based on predetermined performance characteristics of the fuel cell stack, will fail to meet a power requirement of the external load. This allows the user to match the supply of power to the power requirement of an external load while limiting the carbon deposition.

A method according to an eleventh aspect of the present disclosure for operating a fuel cell system is a method for operating a fuel cell system that includes a fuel feeder that supplies fuel, a fuel cell stack that generates power through an electrochemical reaction using air and a hydrogen-containing gas generated from the fuel, and a first temperature sensor that senses a temperature of the fuel cell stack. The fuel cell stack has a membrane electrode assembly including an electrolyte membrane through which protons can pass, a cathode on a first side of the electrolyte membrane, and an anode on a second side of the electrolyte membrane. The method includes defining an upper limit of current output from the fuel cell stack on the basis of the temperature of the fuel cell stack, a supply of the fuel, and hydrogen consumption of the fuel cell stack associated with internal leakage current and keeping the current output from the fuel cell stack at or below the upper limit.

The following describes some embodiments of the present disclosure in specific terms with reference to the drawings. Like or corresponding elements are represented by like numerals throughout and described only once in the following.

Embodiment 1

Figure 1:
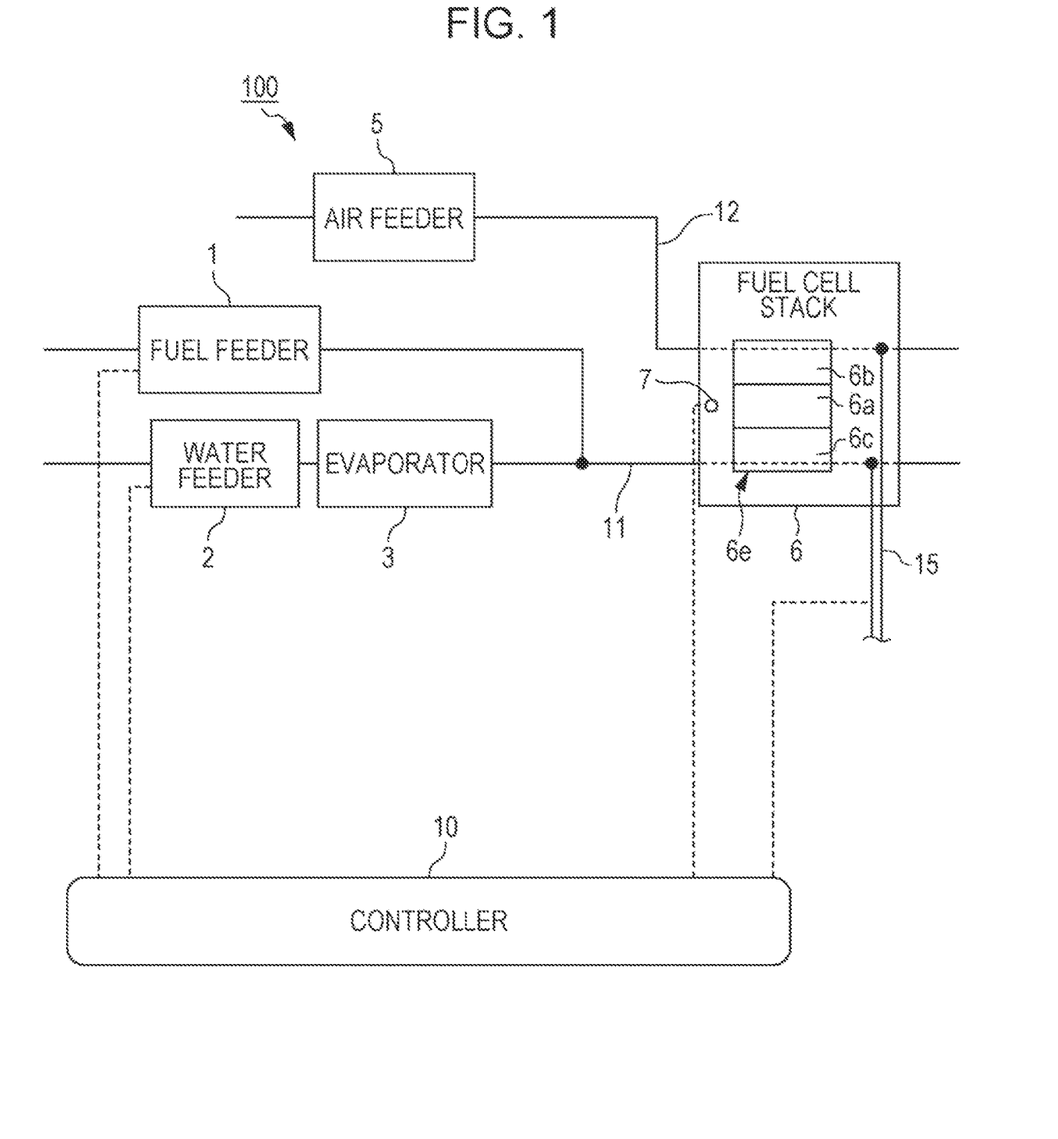
FIG. 1 is a block diagram schematically illustrating the structure of a fuel cell system according to Embodiment 1 of the present disclosure.

FIG. 1 is a block diagram schematically illustrating the structure of a fuel cell system 100 according to Embodiment 1. The fuel cell system 100 includes a fuel cell stack 6, a first temperature sensor 7, a fuel feeder 1, an air feeder 5, a current-out line 15, and a controller 10. The fuel cell system 100 may optionally further include a water feeder 2 and an evaporator 3.

The fuel cell stack 6 generates power through an electrochemical reaction using a hydrogen-containing gas and air. The fuel cell stack 6 has one or multiple membrane electrode assemblies 6e, each membrane electrode assembly 6e including an electrolyte membrane 6a, a cathode 6b, and an anode 6c. The electrolyte membrane 6a is a membrane through which protons can pass (a proton-conducting membrane), the cathode 6b is on one side of the electrolyte membrane 6a, and the anode 6c is on the other side of the electrolyte membrane 6a.

The electrolyte membrane 6a is a proton conductor. An electrolyte membrane 6a having a large ionic conductivity and a small electronic conductivity is desirable. The ionic conductivity of the electrolyte membrane 6a is, for example, higher than 0.001 S/cm, preferably equal to or higher than 0.01 S/cm. The electronic conductivity of the electrolyte membrane 6a is, for example, smaller than the ionic conductivity of the electrolyte membrane 6a by one or more orders of magnitude, preferably two or more orders of magnitude.

The proton conductor may have, for example, a composition of $BaZr_{1-x}M_xO_3$ (0.05≤x≤0.5; M=Sc, In, Lu, Yb, Tm, Er, Y, Ho, Dy, or Gd). Desirably, the proton conductor may be Yb-doped barium zirconate (BZYb). The proton conductor may alternatively be $BaCe_{0.8}Gd_{0.2}O_{3-\sigma}$ or $BaZr_{0.8}Y_{0.2}O_3$.

The thickness of the electrolyte membrane 6a is, for example, 1 μm or more and 50 μm or less. A thinner electrolyte membrane 6a is better for performance in power generation, but if strength is a priority, a larger thickness is better. It is therefore more preferred that the thickness of the electrolyte membrane 6a be, for example, 5 μm or more and 30 μm or less so that both can be balanced.

The anode 6c is preferably a mixed conductor that conducts both electrons and protons, preferably made of substances having a composition stable to reducing gases, such as hydrogen and reformate gases. For example, the anode 6c can be made of a mixture of nickel (Ni) and $BaZr_{1-x}M_xO_3$ (0.05≤x≤0.5; M=Sc, In, Lu, Yb, Tm, Er, Y, Ho, Dy, or Gd). If such an anode 6c is used, the ratio by weight of nickel (Ni) to $BaZr_{1-x}M_xO_3$ can be, for example, 60:40. It should be, however, noted that this is not the only possible composition of the anode 6c.

The thickness of the anode 6c is preferably, for example, 100 μm or more and 2 mm or less so that the anode 6c can serve as a support.

The anode 6c may have a reforming capability with which the anode 6c reforms supplied fuel by steam reforming and generates a gas that contains hydrogen (a hydrogen-containing gas). The hydrogen becomes protons at the anode 6c, releasing electrons (formula 1). The protons pass through the electrolyte membrane 6a and react with the electrons and with oxygen in the air at the cathode 6b, generating steam (formula 2). Because of internal leakage current, the current output is small for the hydrogen consumption at the anode 6c.

Anode: $H_2 \rightarrow 2H^+ + 2e^-$ (1)

Cathode: $O_2 + 4H^+ + 4e^- \rightarrow 2H_2O$ (2)

The first temperature sensor 7 senses the temperature of the fuel cell stack 6. Preferably, the first temperature sensor 7 senses the temperature of the fuel in the anode 6c of the fuel cell stack 6. The first temperature sensor 7 sends the temperature it has sensed to the controller 10.

The fuel feeder 1 supplies fuel to the fuel cell stack 6. The fuel feeder 1 is connected to a source of fuel (not illustrated) and to the upstream end of the anode 6c of the fuel cell stack 6 via a fuel path and a first feeding path 11 at its upstream and downstream ends, respectively. The source of fuel can be, for example, a fuel cylinder or fuel infrastructure. The fuel is fed to the anode 6c as anode gas. The fuel can be, for example, a hydrocarbon fuel, such as natural gas (town gas) or propane gas. The fuel feeder 1 also regulates the flow rate (supply) of fuel fed to the anode 6c.

The water feeder 2 supplies water to the fuel cell stack 6. The water feeder 2 is connected to a source of water (not illustrated) and to the upstream end of the anode 6c of the fuel cell stack 6 via a water path and the first feeding path 11 at its upstream and downstream ends, respectively. The source of water can be, for example, waterworks. When the source of water is waterworks, it is preferred that the structure of the system include elimination of ions contained in the water, such as ion-exchange resins. The water feeder 2 also regulates the flow rate (supply) of water fed to the evaporator 3. The evaporator 3, a piece of equipment that evaporates water supplied from the water feeder 2, is provided in the water path.

The fuel and water paths join at their respective downstream ends into the first feeding path 11. Through the first feeding path 11, a mixture of the fuel coming through the fuel path and steam through the water path (anode gas) flows. The anode gas is fed to the anode 6c of the fuel cell stack 6.

The air feeder 5 supplies air to the fuel cell stack 6. The air feeder 5 is connected to a source of air (not illustrated) and to the upstream end of the cathode 6b of the fuel cell stack 6 via a second feeding path 12 at its upstream and downstream ends, respectively. The source of air can be, for example, the atmosphere. The air feeder 5 also regulates the flow rate (supply) of air fed to the cathode 6b. The air is fed to the cathode 6b of the fuel cell stack 6 as cathode gas.

The current-out line 15 is connected to the fuel cell stack 6 and used to take out the current generated by the fuel cell stack 6. The current-out line 15 is also connected to an external load (not illustrated) via, for example, a power converter, such as an inverter.

The controller 10 controls the individual components of the fuel cell system 100. For example, the controller 10 sends signals to the fuel feeder 1, water feeder 2, and air feeder 5 and regulates the supply from each feeder by controlling the characteristics of the signals, such as current pulse and voltage. The controller 10 also defines an upper limit lm of current output I from the fuel cell stack 6 on the basis of the temperature of the fuel cell stack 6, the supply of the fuel, and the hydrogen consumption of the fuel cell stack 6 associated with internal leakage current and keeps the current output I from the fuel cell stack 6 at or below the upper limit lm.

The structure of the controller 10 is not critical as long as it has a control capability. For example, the controller 10 may have a processing unit (not illustrated), such as an MPU or CPU, and a memory unit (not illustrated), such as a memory. The memory unit stores information such as basic programs that allow the fuel cell system 100 to work and kinds of fixed data. The processing unit reads and executes the basic and other software programs stored in the memory unit to control the operations of the fuel cell system 100.

There may be either one controller 10 for centralized control or multiple controllers 10 that work together for distributed control.

Figure 2A:
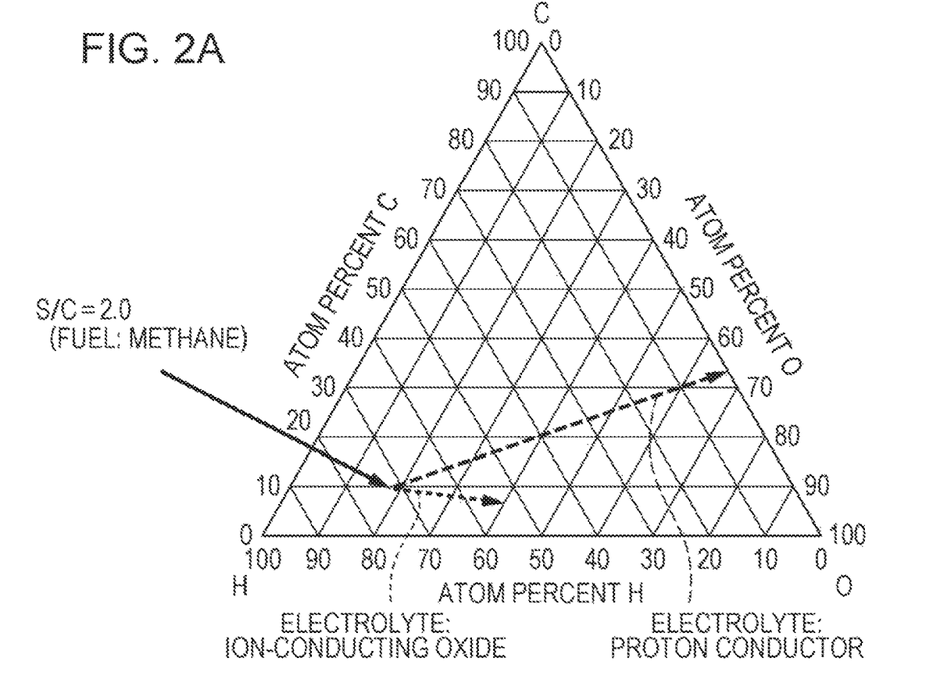
FIG. 2A is a C—H—O ternary diagram illustrating changes in the composition of anode gas for two fuel cells, one in which an oxide ion-conducting electrolyte is used and the other in which a proton-conducting electrolyte is used, with the fuel being methane and S/C=2.0.
Figure 2B:
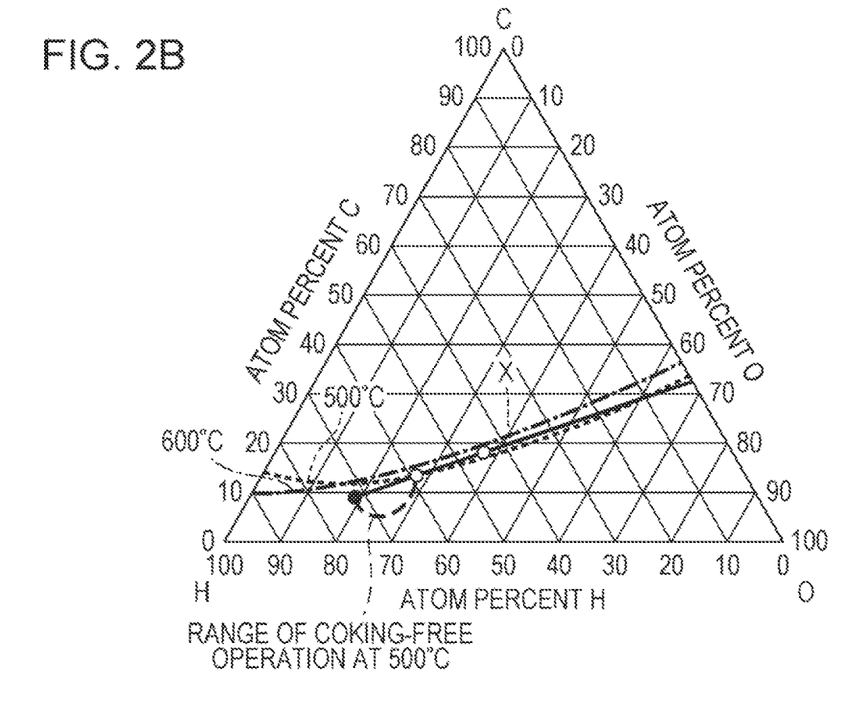
FIG. 2B is a C—H—O ternary diagram illustrating coking regions of the fuel cell system of FIG. 1 with a plot of compositions of anode gas, with the fuel being methane and S/C being 2.0.

The following describes a method for operating the fuel cell system 100 according to Embodiment 1 with reference to FIGS. 2A and 2B. This method is controlled by the controller 10.

FIG. 2A is a C—H—O ternary diagram illustrating changes in the composition of anode gas for two fuel cells, one in which the electrolyte is an oxide ion-conductor and the other in which the electrolyte is a proton conductor, with the fuel being methane and S/C=2.0. As can be seen from the diagram, when the electrolyte is an oxide ion-conductor, the proportion of oxygen increases with the progress of power generation, and when the electrolyte is a proton conductor, the proportion of hydrogen decreases with the progress of power generation.

FIG. 2B is a C—H—O ternary diagram (C:H:O ratio profile) illustrating coking regions at 500° C. and 600° C. with a plot of compositions of anode gas for a fuel cell in which the electrolyte is a proton conductor, with the fuel being methane and S/C being 2. The following describes cases in which the fuel is methane. Cases with other fuels give the same results and are not described.

Specifically, in response to a start-up command, the fuel and air are supplied, and the evaporator 3 and the fuel cell stack 6 are heated by combustion heat coming from a burner (not illustrated) and by a heater (not illustrated). Then water is allowed to flow, a mixture of steam and the fuel is fed to the anode 6c, and electric current is taken out. If the temperature of the fuel cell stack 6 is low during this, carbon may deposit. The current output I from the fuel cell stack 6 is thus limited to prevent carbon deposition.

The controller 10 calculates the flow rates X, Y, and Z of carbon, hydrogen, and oxygen atoms, respectively, in the anode gas on the basis of information about the composition and supply of the fuel and the supply of steam. These flow rates, the temperature of the fuel cell stack 6, and the preset pressure P0 of anode gas are used to determine the critical flow rate YL of hydrogen atoms, below which no coking occurs. The fuel composition and the anode-gas pressure P0 are predetermined parameters, the fuel and steam supplies are controlled parameters, and the temperature of the fuel cell stack 6 is the value sensed by the first temperature sensor 7.

Specifically, the flow rate X of carbon atoms, flow rate Z of oxygen atoms, temperature of the fuel cell stack 6, and pressure P0 of the anode gas are fixed, and the thermodynamic equilibrium of the anode gas is calculated at descending flow rates Y of hydrogen atoms. The lowest flow rate of hydrogen atoms that can be reached without coking is the critical flow rate YL of hydrogen atoms.

The critical flow rate YL of hydrogen atoms may be determined either by performing a fresh thermodynamic equilibrium calculation or by referring to a table that has been prepared beforehand through thermodynamic equilibrium calculations. When the proton conductor is of a kind that becomes conductive to protons by taking in $H_2O$, the critical flow rate YL of hydrogen atoms may be calculated after reducing the amount of $H_2O$ (two hydrogen atoms and one oxygen atom) that would be required under the given temperature and pressure conditions and subtracting the corresponding hydrogen and oxygen partial pressures from the pressure of the anode gas. However, the influence of $H_2O$ intake is negligible because the proton conductor usually finishes taking in $H_2O$ before the fuel cell stack 6 is ready to operate.

The controller 10 then determines the hydrogen consumption YC of the fuel cell stack 6 associated with internal leakage current, for example using a reference YC table prepared beforehand. The reference YC table contains, for example, information about the relationship of the hydrogen consumption YC versus the flow rate X of carbon atoms, flow rate Z of oxygen atoms, temperature of the fuel cell stack 6, and pressure P0 of the anode gas. The data for the reference YC table can be obtained as follows.

First, the amount of $H_2O$ at the entry to the cathode 6b of the fuel cell stack 6 (A) and that at the exit from the cathode 6b (B) are measured. This gives the actual increase in $H_2O$ at the cathode 6b (B–A). The production of $H_2O$ at the cathode 6b assuming the absence of internal leakage current (C) is also calculated, from the power generated by the fuel cell stack 6 in accordance with formula 2. Then the theoretical amount of $H_2O$ (C) is subtracted from the measured amount of $H_2O$ (B–A) to give a difference (B–A)–C. This difference (B–A)–C is the amount of $H_2O$ produced as a result of internal leakage current and is equal to the hydrogen consumption YC associated with internal leakage current.

Alternatively, the amount of $H_2$ at the entry to the anode 6c of the fuel cell stack 6 (D) and that at the exit from the anode 6c (E) are measured. This gives the actual consumption of $H_2$ at the anode 6c (D–E).

The consumption of $H_2$ at the anode 6c assuming the absence of internal leakage current (F) is also calculated, from the power generated by the fuel cell stack 6 in accordance with formula 1. The theoretical amount of $H_2$ (F) is subtracted from the measured amount of $H_2$ (D–E) to give a difference (D–E)–F as the hydrogen consumption YC associated with internal leakage current.

Collecting hydrogen consumption YC data under various conditions by such a method will give a reference table for hydrogen consumption YC. Using this reference table, the hydrogen consumption YC of the fuel cell stack 6 associated with internal leakage current is determined. This, however, is not the only possible way to obtain the hydrogen consumption YC of the fuel cell stack 6 associated with internal leakage current. An example of an alternative is to install a gas composition analyzer in the fuel cell system 100 and obtain the hydrogen consumption YC therewith.

Then the controller 10 subtracts the lowest flow rate YL of hydrogen atoms that can be reached without coking (critical flow rate of hydrogen atoms) and the hydrogen consumption YC of the fuel cell stack 6 associated with internal leakage current from the flow rate Y of hydrogen atoms to find the maximum supply YM (=Y–YL–YC) of hydrogen atoms to power generation that can be reached without coking. The controller 10 then determines an upper limit lm of current output I from the fuel cell stack 6 on the basis of the maximum supply YM of hydrogen atoms. The relationship between this maximum supply YM of hydrogen atoms and the upper limit lm of current output I has been established beforehand through, for example, an experiment and is provided as a database or something similar. In this way, the hydrogen consumption YC of the fuel cell stack 6 associated with internal leakage current is determined under different operating conditions, and the controller 10 can consult the results as a database while the fuel cell system 100 is operating.

Alternatively, it is also possible to find flow rates of carbon, hydrogen, and oxygen atoms at which carbon does not deposit (critical flow rates) by using FIG. 2B or any such chart. In FIG. 2B, the solid line represents relative flow rates (%) of carbon, hydrogen, and oxygen atoms in anode gas (compositions of anode gas) for a fuel cell stack 6 at a given S/C (e.g., 2.0) and a given pressure. The dotted line is a line that represents compositions of anode gas at which coking starts at 500° C. at the given pressure (boundary), and the dot and chain line a boundary at 600° C. Thermodynamically speaking, carbon deposits in the regions above these lines (the side of higher proportions of carbon atoms) (coking regions).

For example, an anode gas having the composition indicated by point X on the solid line in FIG. 2B is above the boundary at 500° C. With this anode gas, carbon deposits when the temperature of the fuel cell stack 6 is 500° C. or less. By changing the composition of the anode gas along the solid line toward higher proportions of hydrogen to a point below the boundary at 500° C., coking can be avoided. At 600° C., carbon does not deposit.

In this way, flow rates of carbon, hydrogen, and oxygen atoms at which carbon does not deposit (critical flow rates) are determined from an available temperature profile of critical C:H:O ratios for coking and the temperature of the fuel cell stack 6. This gives the critical flow rate YL of hydrogen atoms. The C:H:O ratio profile has been established beforehand through, for example, thermodynamic equilibrium calculation from the given S/C, pressure of the anode gas, and composition of the fuel as illustrated in FIG. 2A. The temperature of the fuel cell stack 6 is sensed by the first temperature sensor 7.

Then the controller 10 calculates, by subtracting the critical flow rate YL of hydrogen atoms and the hydrogen consumption YC of the fuel cell stack 6 associated with internal leakage current from the flow rate Y of hydrogen atoms, the maximum supply YM of hydrogen atoms to power generation that can be reached without coking. From this maximum supply YM of hydrogen atoms, the controller 10 determines an upper limit lm of current output I from the fuel cell stack 6. The relationship between this maximum supply YM of hydrogen atoms and the upper limit lm of current output I has been established beforehand through, for example, an experiment.

The controller 10 keeps the current output I from the fuel cell stack 6 at or below the upper limit lm by, for example, controlling a power converter or any such component to which the current-out line 15 is connected. This limitation of current output considering even the hydrogen consumption of the fuel cell stack 6 associated with internal leakage current will limit the carbon deposition in the anode 6c, thereby reducing the loss of performance of the fuel cell stack 6.

The upper limit lm of current output I may be multiplied by a predetermined safety factor to give another upper limit of current output at or below which the current output I from the fuel cell stack 6 may be kept.

Embodiment 2

Figure 3:
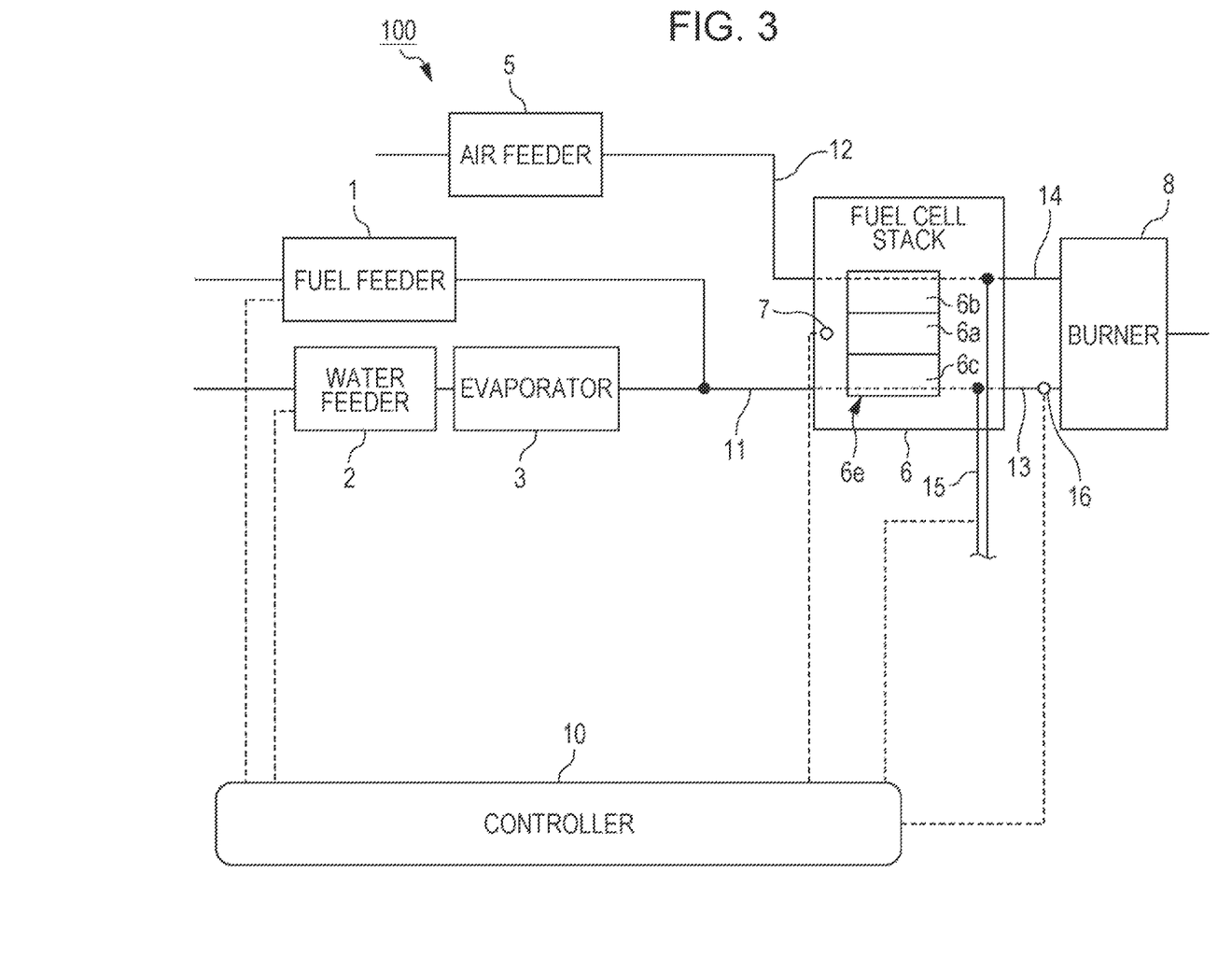
FIG. 3 is a block diagram schematically illustrating the structure of a fuel cell system according to Embodiment 2 of the present disclosure.

FIG. 3 is a block diagram schematically illustrating the structure of a fuel cell system 100 according to Embodiment 2. This fuel cell system 100 includes a first off-gas path 13 and a second temperature sensor 16 in addition to the components of the fuel cell system 100 according to Embodiment 1. The fuel cell system 100 may further include a burner 8 and a second off-gas path 14.

The burner 8 is connected to the downstream end of the anode 6c by the first off-gas path 13 and to the downstream end of the cathode 6b by the second off-gas path 14. As a result, the gas discharged from the anode 6c (anode off-gas) and the gas discharged from the cathode 6b (cathode off-gas) are fed to the burner 8.

The anode off-gas contains hydrogen, steam, carbon dioxide, carbon monoxide, unreformed fuel, and so forth. The cathode off-gas contains, for example, oxygen not used while the fuel cell stack 6 generates power. The burner 8 burns combustible gases with oxygen and discharges a gas (combustion gas). The resulting combustion heat and/or the heat of the combustion gas is used to heat the evaporator 3 and the fuel cell stack 6.

The second temperature sensor 16 senses the temperature of the anode off-gas. Provided in the first off-gas path 13, the second temperature sensor 16 senses the temperature of the anode off-gas and sends it to the controller 10.

The controller 10 defines an upper limit lm of current output I from the fuel cell stack 6 on the basis of either the temperature of the fuel cell stack 6 or that of the anode off-gas, whichever is lower, the supply of the fuel, and the hydrogen consumption YC of the fuel cell stack 6 associated with internal leakage current and keeps the current output I from the fuel cell stack 6 at or below the upper limit lm.

A more specific description is as follows. Not only the anode gas, but also the anode off-gas contains the fuel and other hydrocarbons and carbon monoxide. Thus, when the temperature of the anode off-gas, in the first off-gas path 13, is low due to heat radiation or other causes, carbon can deposit in the first off-gas path 13, too. The controller 10 therefore determines the temperature of the anode off-gas from the value given by the second temperature sensor 16, as well as determining the temperature of the fuel cell stack 6 from the value given by the first temperature sensor 7. Since coking is more likely to occur with lower temperatures, the lower one of the temperatures of the fuel cell stack 6 and anode off-gas is determined.

The controller 10 calculates the flow rates X, Y, and Z of carbon, hydrogen, and oxygen atoms, respectively, in the anode gas on the basis of information about the composition and supply of the fuel and the supply of steam. These flow rates, the lower one of the temperatures of the fuel cell stack 6 and anode off-gas, and the preset pressure P0 of anode gas are used to determine the critical flow rate YL of hydrogen atoms, below which no coking occurs. The critical flow rate YL of hydrogen atoms may otherwise be determined from, for example, the lowest flow rate of hydrogen atoms at either the temperature of the fuel cell stack 6 or that of the anode off-gas, whichever is lower, through thermodynamic equilibrium calculation. Alternatively, it is possible to find the critical flow rate YL of hydrogen atoms on the basis of an available profile of critical C:H:O ratios for coking and the lower one of the temperatures of the fuel cell stack 6 and anode off-gas by using FIG. 2B or any such chart.

The controller 10, moreover, acquires the hydrogen consumption YC of the fuel cell stack 6 associated with internal leakage current, for example from the mass balance for $H_2O$ or $H_2$ as described above.

The controller 10 calculates, by subtracting the critical flow rate YL of hydrogen atoms and the hydrogen consumption YC of the fuel cell stack 6 associated with internal leakage current from the flow rate Y of hydrogen atoms, the maximum supply YM (=Y−YL−YC) of hydrogen atoms to power generation that can be reached without coking. From this maximum supply YM of hydrogen atoms, the controller 10 determines an upper limit lm of current output I from the fuel cell stack 6.

The controller 10 then keeps the current output I from the fuel cell stack 6 at or below the upper limit lm by, for example, controlling a power converter or any such component to which the current-out line 15 is connected. Considering the hydrogen consumption associated with internal leakage current in this way will limit the carbon deposition in the anode 6c and first off-gas path 13, thereby reducing the loss of performance of the fuel cell stack 6.

Embodiment 3

Figure 4:
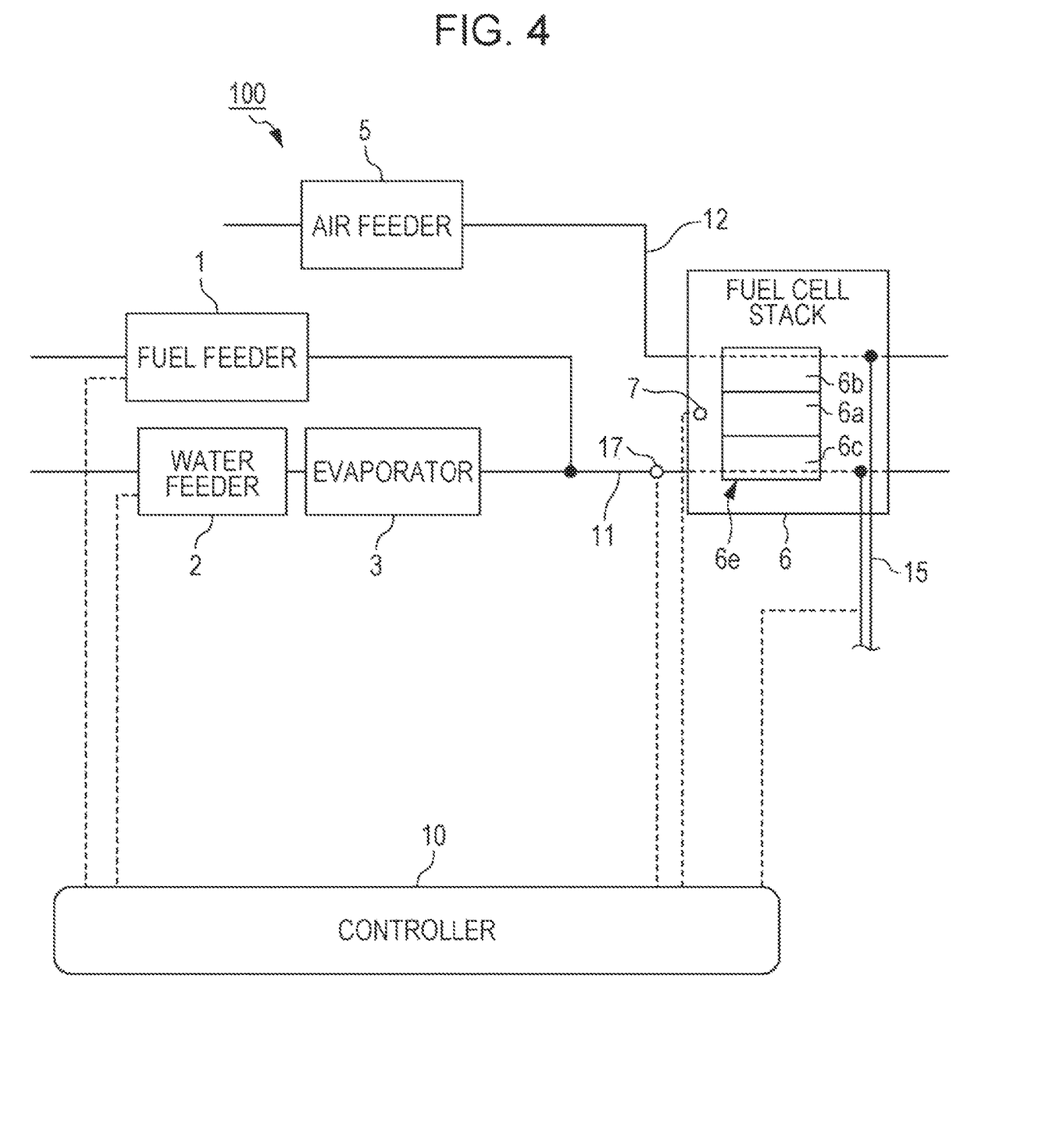
FIG. 4 is a block diagram schematically illustrating the structure of a fuel cell system according to Embodiment 3 of the present disclosure.

FIG. 4 is a block diagram schematically illustrating the structure of a fuel cell system 100 according to Embodiment 3. This fuel cell system 100 includes a pressure sensor 17 and a pressurizing unit in addition to the components of the fuel cell system 100 according to Embodiment 1.

The pressure sensor 17 senses the pressure of the gas fed to the anode 6c (anode gas). Provided in the first feeding path 11, the pressure sensor 17 senses the pressure of the anode gas while it flows through the first feeding path 11. The pressure sensor 17 sends the pressure it has sensed to the controller 10.

The pressurizing unit is, for example, a compressor. As an example of a possible form of the pressurizing unit, the fuel feeder 1 may have a built-in capability to pressurize the anode gas. Alternatively, the air feeder 5 may have a built-in capability to pressurize the cathode gas.

As described in, for example, A. D. Tevebaugh and E. J. Cairns, Carbon Deposition Boundaries in the CHO System at Several Pressures, *J. Chem. Eng. Data,* 10, 359-362 (1965), the coking region in a C:H:O ratio profile changes with pressure. The controller 10 thus defines an upper limit lm of current output I from the fuel cell stack 6 on the basis of the temperature of the fuel cell stack 6, the supply of the fuel, the pressure of the anode gas, and the hydrogen consumption of the fuel cell stack 6 associated with internal leakage current and keeps the current output I from the fuel cell stack 6 at or below the upper limit lm.

Specifically, the controller 10 calculates the flow rates X, Y, and Z of carbon, hydrogen, and oxygen atoms, respectively, in the anode gas on the basis of information about the composition and supply of the fuel and the supply of steam. These flow rates, the temperature of the fuel cell stack 6, and the pressure P of anode gas sensed by the pressure sensor 17 are used to determine the critical flow rate YL of hydrogen atoms, below which no coking occurs. The critical flow rate YL of hydrogen atoms may otherwise be determined from, for example, the lowest flow rate of hydrogen atoms at the pressure P of anode gas sensed by the pressure sensor 17 through thermodynamic equilibrium calculation. Alternatively, it is possible to find the critical flow rate YL of hydrogen atoms on the basis of an available pressure profile of critical C:H:O ratios for coking according to the pressure of anode gas sensed by the pressure sensor 17 and the temperature of the fuel cell stack 6 by using FIG. 2B or any such chart.

The controller 10, moreover, acquires the hydrogen consumption YC of the fuel cell stack 6 associated with internal leakage current, for example from the mass balance for $H_2O$ or $H_2$ as described above.

The controller 10 calculates, by subtracting the critical flow rate YL of hydrogen atoms and the hydrogen consumption YC of the fuel cell stack 6 associated with internal leakage current from the flow rate Y of hydrogen atoms, the maximum supply YM (=Y−YL−YC) of hydrogen atoms to power generation that can be reached without coking. From this maximum supply YM of hydrogen atoms, the controller 10 determines an upper limit lm of current output I from the fuel cell stack 6.

The controller 10 then keeps the current output I from the fuel cell stack 6 at or below the upper limit lm by, for example, controlling a power converter or any such component to which the current-out line 15 is connected. Considering the hydrogen consumption associated with internal leakage current in this way will limit the carbon deposition in the anode 6c, thereby reducing the loss of performance of the fuel cell stack 6.

Embodiment 4

Figure 5:
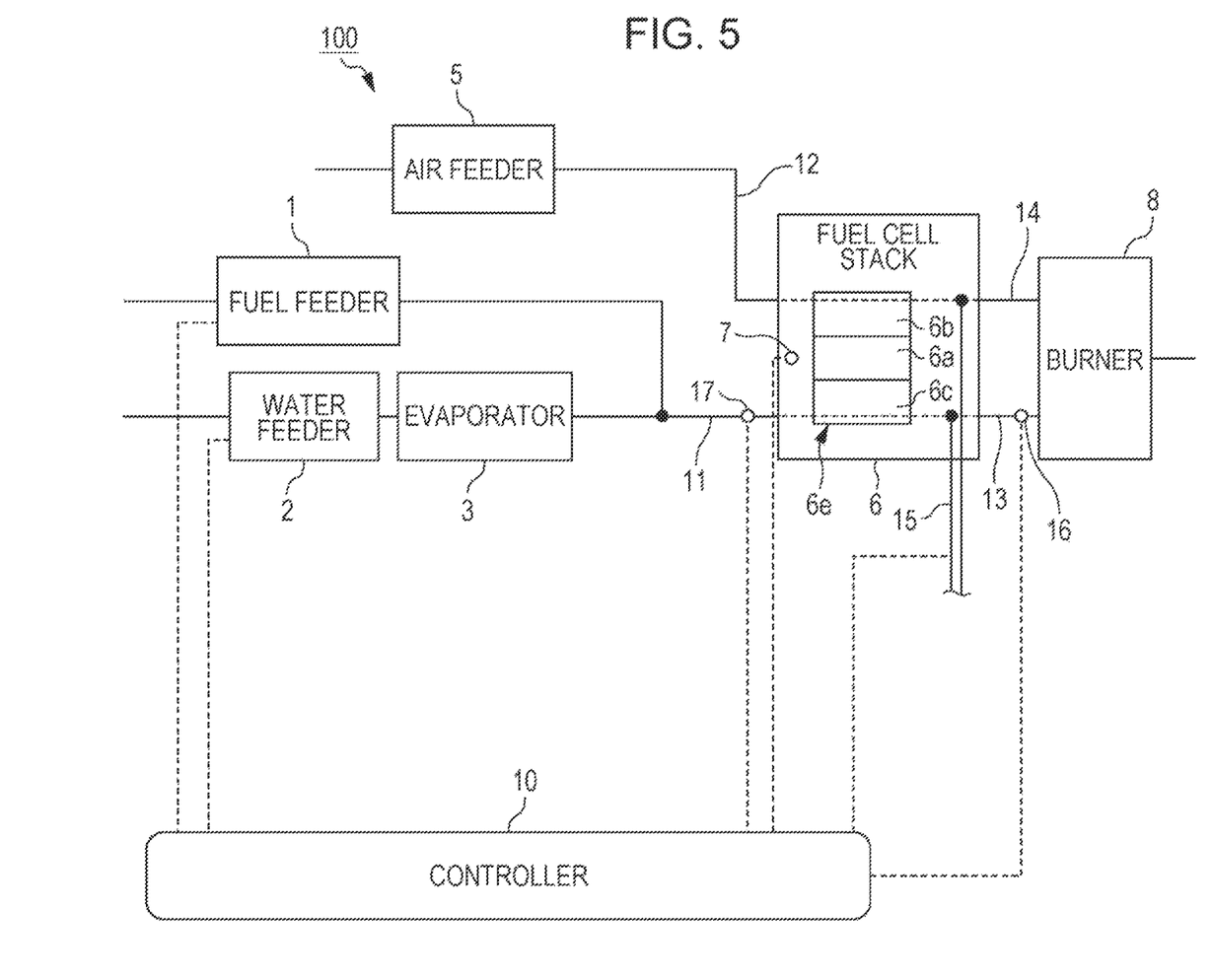
FIG. 5 is a block diagram schematically illustrating the structure of a fuel cell system according to Embodiment 4 of the present disclosure.

FIG. 5 is a block diagram schematically illustrating the structure of a fuel cell system 100 according to Embodiment 4. This fuel cell system 100 includes a first off-gas path 13 and a second temperature sensor 16 in addition to the components of the fuel cell system 100 according to Embodiment 3. The fuel cell system 100 may further include a burner 8 and a second off-gas path 14. These components are equivalent to those in the fuel cell system 100 according to Embodiment 2 and their details are not repeated.

The controller 10 defines an upper limit lm of current output I from the fuel cell stack 6 on the basis of either the temperature of the fuel cell stack 6 or that of the anode off-gas, whichever is lower, the supply of the fuel, the pressure of the anode gas, and the hydrogen consumption of the fuel cell stack 6 associated with internal leakage current and keeps the current output I from the fuel cell stack 6 at or below the upper limit lm.

Specifically, the controller 10 calculates the flow rates X, Y, and Z of carbon, hydrogen, and oxygen atoms, respectively, in the anode gas on the basis of information about the composition and supply of the fuel and the supply of steam. These flow rates, the lower one of the temperatures of the fuel cell stack 6 and anode off-gas, and the pressure P of anode gas sensed by the pressure sensor 17 are used to determine the critical flow rate YL of hydrogen atoms, below which no coking occurs. The critical flow rate YL of hydrogen atoms may otherwise be determined from, for example, the lowest flow rate of hydrogen atoms at the pressure P of anode gas sensed by the pressure sensor 17 and at either the temperature of the fuel cell stack 6 or that of the anode off-gas, whichever is lower, through thermodynamic equilibrium calculation. Alternatively, it is possible to find the critical flow rate YL of hydrogen atoms on the basis of an available pressure profile of critical C:H:O ratios for coking according to the pressure of anode gas sensed by the pressure sensor 17 and the lower one of the temperatures of the fuel cell stack 6 and anode off-gas by using FIG. 2B or any such chart.

The controller 10, moreover, acquires the hydrogen consumption YC of the fuel cell stack 6 associated with internal leakage current, for example from the mass balance for $H_2O$ or $H_2$ as described above.

The controller 10 calculates, by subtracting the critical flow rate YL of hydrogen atoms and the hydrogen consumption YC of the fuel cell stack 6 associated with internal leakage current from the flow rate Y of hydrogen atoms, the maximum supply YM (=Y−YL−YC) of hydrogen atoms to power generation that can be reached without coking. From this maximum supply YM of hydrogen atoms, the controller 10 determines an upper limit lm of current output I from the fuel cell stack 6.

The controller 10 then keeps the current output I from the fuel cell stack 6 at or below the upper limit lm by, for example, controlling a power converter or any such component to which the current-out line 15 is connected. Considering the hydrogen consumption associated with internal leakage current in this way will limit the carbon deposition in the anode 6c and first off-gas path 13, thereby reducing the loss of performance of the fuel cell stack 6.

Embodiment 5

Figure 6:
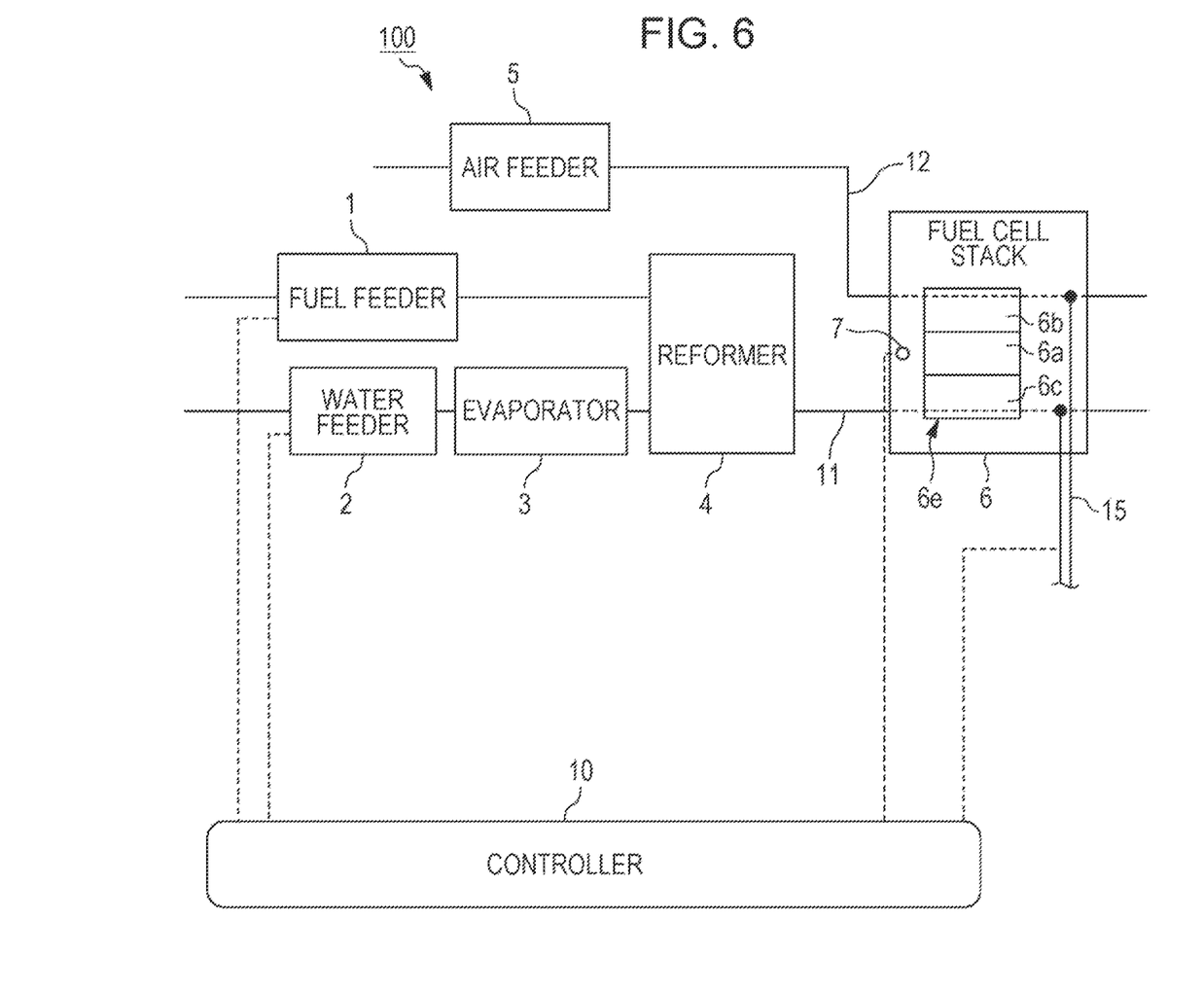
FIG. 6 is a block diagram schematically illustrating the structure of a fuel cell system according to Embodiment 5 of the present disclosure.

FIG. 6 is a block diagram schematically illustrating the structure of a fuel cell system 100 according to Embodiment 5. This fuel cell system 100 includes a reformer 4 in addition to the components of the fuel cell system 100 according to Embodiment 1. Whereas the fuel cell stack 6 according to Embodiment 1 is an internal-reforming one, which has a built-in reforming capability, the fuel cell stack 6 according to Embodiment 5 is an external-reforming one, which has no built-in reforming capability and has an external reformer 4 instead. However, the fuel cell stack 6 may have a built-in reforming capability in addition to the reformer 4.

The reformer 4 is connected to the fuel feeder 1 by the fuel path, to the evaporator 3 by the water path, and to the anode 6c of the fuel cell stack 6 by the first feeding path 11. The fuel feeder 1 and the evaporator 3 supply the fuel and steam, respectively, to the reformer 4. In the reformer 4 there is a Ru-based reforming catalyst, and the steam reforms the fuel in the presence of the reforming catalyst. The resulting hydrogen-containing gas is supplied to the anode 6c.

Examples of reforming reactions that can be used include steam reforming, partial oxidation, and autothermal reforming, which is a combination of steam reforming and partial oxidation. The equipment for the reforming reaction selected is provided as necessary. For example, if the reforming reaction involves partial oxidation and autothermal reforming, an oxidant gas feeder is connected to the reformer 4.

In this fuel cell system 100 including a reformer 4, too, the controller 10 defines an upper limit lm of current output I from the fuel cell stack 6 on the basis of the temperature of the fuel cell stack 6, the supply of the fuel, and the hydrogen consumption of the fuel cell stack 6 associated with internal leakage current and keeps the current output I from the fuel cell stack 6 at or below the upper limit lm. This limits the carbon deposition in the anode 6c.

The fuel cell systems 100 according to Embodiments 2 to 4 can also have a reformer 4. The structure, operation, and advantages of fuel cell systems 100 according to Embodiments 2 to 4 with a reformer 4 are similar to those without it and are not described. In such a case, the anode gas is supplied to the anode 6c with at least one of the fuel and the hydrogen-containing gas therein.

Embodiment 6

A fuel cell system 100 according to Embodiment 6 has the same components as the fuel cell system 100 according to Embodiment 1, illustrated in FIG. 1. The controller 10 increases the supply of at least one of the fuel and water if it determines that the supply of power from the fuel cell stack 6 based on predetermined performance characteristics of the fuel cell stack 6 will fail to meet the power requirement of the external load. The current output profile, which is one of the performance characteristics, of the fuel cell stack 6 has been established beforehand through, for example, an experiment.

Specifically, the controller 10 calculates the flow rates X, Y, and Z of carbon, hydrogen, and oxygen atoms, respectively, in the anode gas on the basis of information about the composition and supply of the fuel and the supply of steam. These flow rates, the temperature of the fuel cell stack 6, and the preset pressure P0 of anode gas are used to determine the critical flow rate YL of hydrogen atoms, below which no coking occurs. The critical flow rate YL of hydrogen atoms may otherwise be determined from, for example, the lowest flow rate of hydrogen atoms through thermodynamic equilibrium calculation. Alternatively, it is possible to find the critical flow rate YL of hydrogen atoms on the basis of an available profile of critical C:H:O ratios for coking and the temperature of the fuel cell stack 6 using FIG. 2B or any such chart.

The controller 10, moreover, acquires the hydrogen consumption YC of the fuel cell stack 6 associated with internal leakage current, for example from the mass balance for $H_2O$ or $H_2$ as described above.

The controller 10 calculates, by subtracting the critical flow rate YL of hydrogen atoms and the hydrogen consumption YC of the fuel cell stack 6 associated with internal leakage current from the flow rate Y of hydrogen atoms, the maximum supply YM (=Y−YL−YC) of hydrogen atoms to power generation that can be reached without coking. From this maximum supply YM of hydrogen atoms, the controller 10 determines an upper limit lm of current output I from the fuel cell stack 6.

The controller 10 then keeps the current output I from the fuel cell stack 6 at or below the upper limit lm by, for example, controlling a power converter or any such component to which the current-out line 15 is connected. This limits the carbon deposition in the anode 6c. With this current output I, however, the supply of power from the fuel cell stack 6 may fail to meet the power requirement of the external load in some cases.

Thus, the controller 10 acquires the power requirement of the external load from the external load itself or a power converter or any such component. Then the controller 10 determines the amount of power the fuel cell stack 6 should supply from the upper limit lm of current output on the basis of the current output profile, which has been established beforehand. If the determined supply of power from the fuel cell stack 6 is smaller than the power requirement of the external load, the controller 10 determines that the supply of power will fail to meet the power requirement.

In this situation, the controller 10 increases the supply of the fuel and/or water to increase the supply of power. To match the supplied power to the power requirement, the controller 10 may increase the supply of at least one of the fuel and water on the basis of predetermined information that defines the relationship of the power supplied with the supply of fuel and with the supply of water. The increase in the supply of at least one of the fuel and water leads to an increase in the supply of power from the fuel cell stack 6. As a result, the supply of power from the fuel cell system 100 is matched to the amount of power the external load requires.

The current output profile that is used may be one that considers the aging of the fuel cell, such as the duration of power generation, total amount of power generated, and duration of operation.

In the fuel cell systems 100 according to Embodiments 2 to 5, too, the controller 10 can work as in Embodiment 6. The operation and advantages of fuel cell systems 100 according to Embodiments 2 to 5 in which the controller 10 works as above are similar to those in Embodiment 6 and are not described.

Embodiment 7

Figure 7:
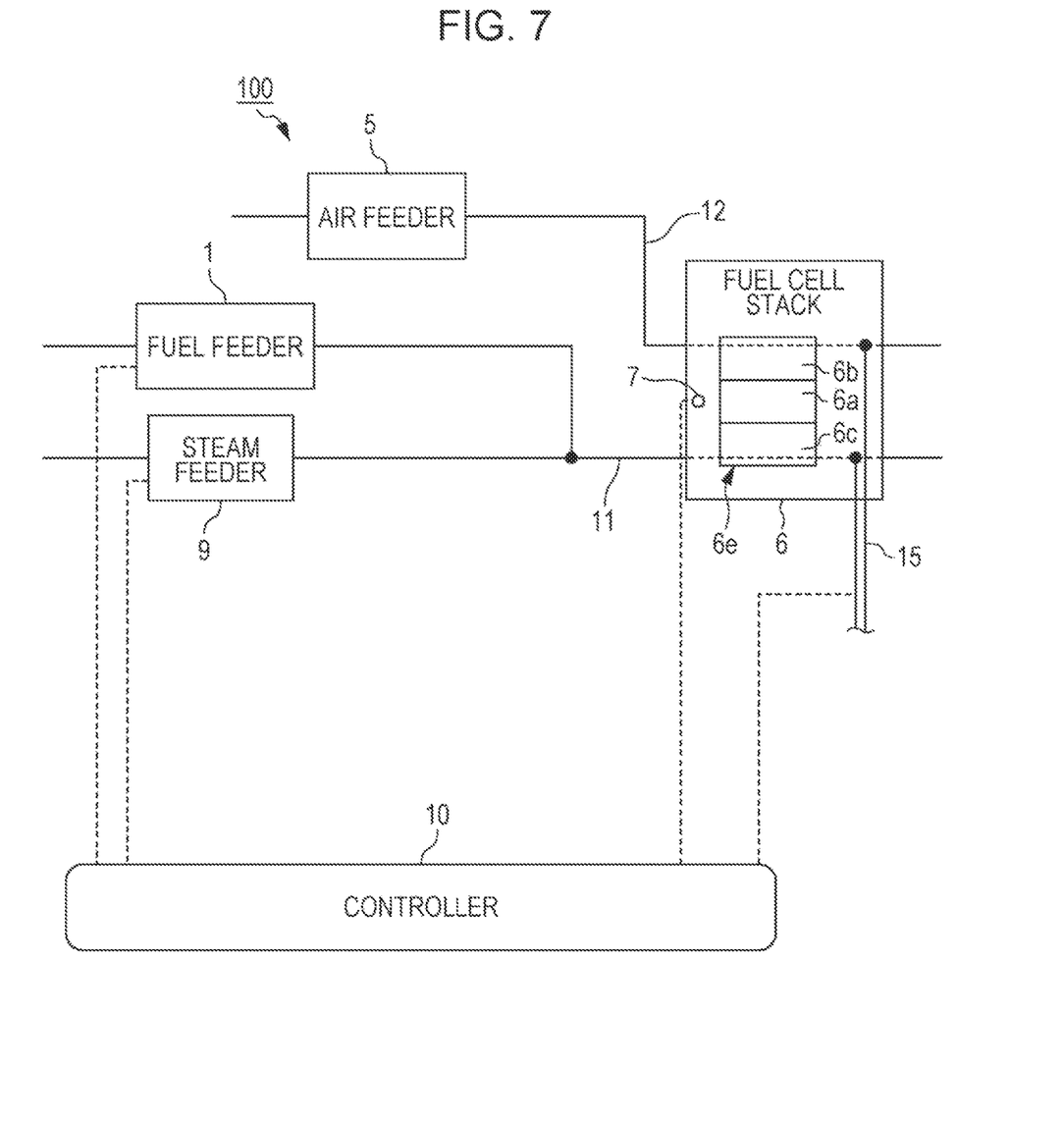
FIG. 7 is a block diagram schematically illustrating the structure of a fuel cell system according to Embodiment 7 of the present disclosure.

FIG. 7 is a block diagram schematically illustrating the structure of a fuel cell system 100 according to Embodiment 7. This fuel cell system 100 includes a steam feeder 9 instead of the water feeder 2 and evaporator 3 of the fuel cell system 100 according to Embodiment 1.

The steam feeder 9 supplies steam to the fuel cell stack 6. The steam feeder 9 is connected to a source of steam (not illustrated) and to the upstream end of the anode 6c of the fuel cell stack 6 via a water path and the first feeding path 11 at its upstream and downstream ends, respectively. The steam feeder 9 regulates the flow rate (supply) of steam fed to the anode 6c.

In this fuel cell system 100 including a steam feeder 9, too, the controller 10 defines an upper limit lm of current output I from the fuel cell stack 6 on the basis of the temperature of the fuel cell stack 6, the supply of the fuel, and the hydrogen consumption of the fuel cell stack 6 associated with internal leakage current and keeps the current output I from the fuel cell stack 6 at or below the upper limit lm. This limits the carbon deposition in the anode 6c.

The controller 10, moreover, increases the supply of the fuel and/or steam if it determines that the supply of power from the fuel cell stack 6 based on predetermined performance characteristics of the fuel cell stack 6 will fail to meet the power requirement of the external load. To match the supplied power to the power requirement, the controller 10 may increase the supply of at least one of the fuel and steam on the basis of predetermined information that defines the relationship of the power supplied with the supply of fuel and with the supply of steam. As a result, the supply of power from the fuel cell system 100 is matched to the amount of power the external load requires.

The fuel cell system 100 according to Embodiment 7 controls the steam feeder 9 to increase the supply of steam instead of controlling the water feeder 2 to increase the supply of water. The resulting operation and advantages are similar to those of Embodiment 6 and are not described.

The fuel cell systems 100 according to Embodiment 2 to 6 can also have a steam feeder 9 instead of the water feeder 2 and evaporator 3. The operation and advantages of fuel cell systems 100 according to Embodiments 2 to 6 with a steam feeder 9 are similar to those in Embodiment 7 and are not described.

Embodiment 8

Figure 8:
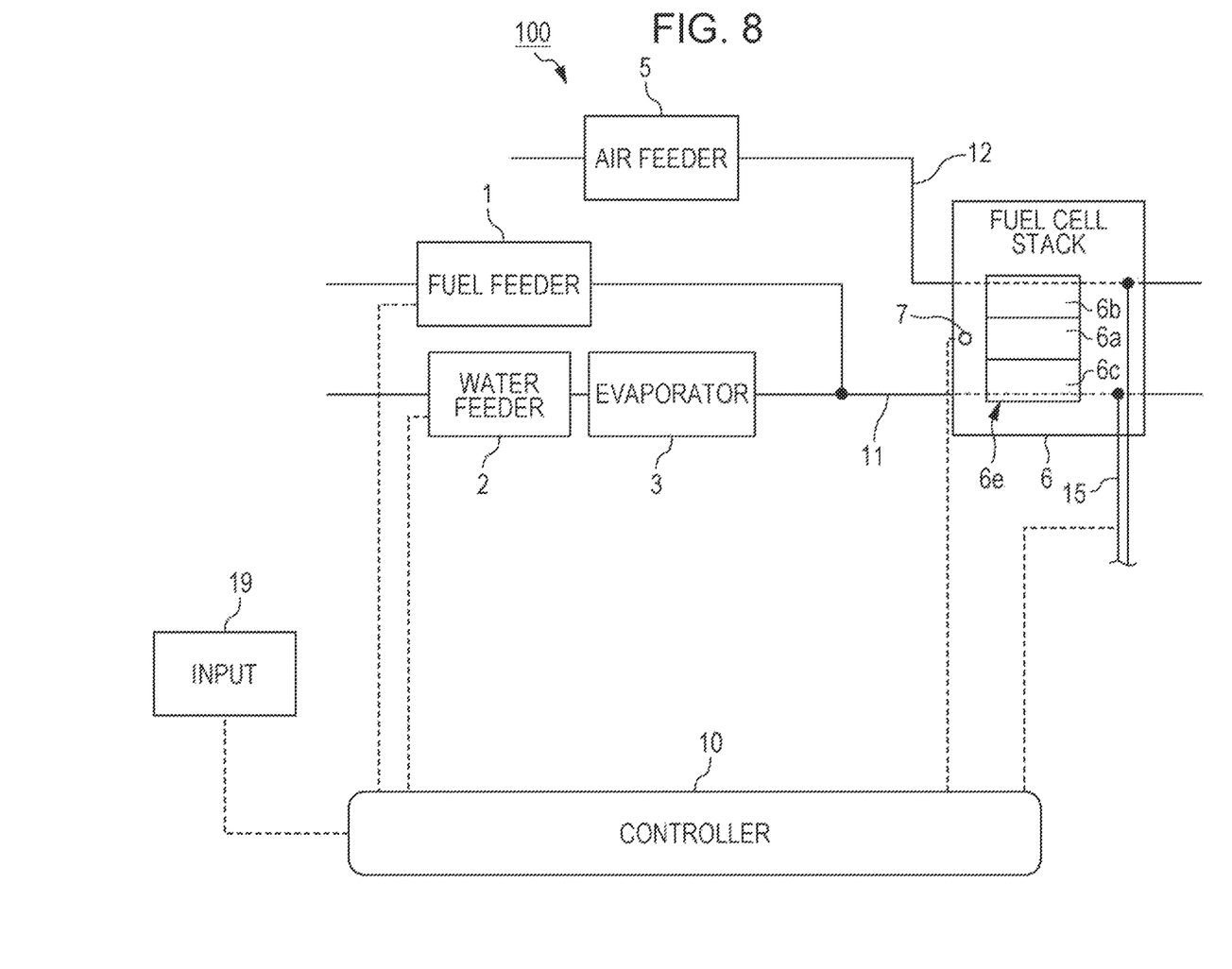
FIG. 8 is a block diagram schematically illustrating the structure of a fuel cell system according to Embodiment 8 of the present disclosure.

FIG. 8 is a block diagram schematically illustrating the structure of a fuel cell system 100 according to Embodiment 8. This fuel cell system 100 includes an input 19 in addition to the components of the fuel cell system 100 according to Embodiment 1.

The input 19 is a unit used to input the composition of the fuel. By the user's operation of the input 19 or a communication means the input 19 has, the composition of the fuel is input to the controller 10 via the input 19.

The controller 10 defines an upper limit lm of current output I from the fuel cell stack 6 on the basis of the temperature of the fuel cell stack 6, the supply of the fuel, the composition of the fuel, and the hydrogen consumption of the fuel cell stack 6 associated with internal leakage current and keeps the current output I from the fuel cell stack 6 at or below the upper limit lm.

The controller 10 calculates the flow rates X, Y, and Z of carbon, hydrogen, and oxygen atoms, respectively, in the anode gas on the basis of the input composition of the fuel and information about the supply of the fuel and steam. These flow rates, the temperature of the fuel cell stack 6, and the preset pressure P0 of anode gas are used to determine the critical flow rate YL of hydrogen atoms, below which no coking occurs. The critical flow rate YL of hydrogen atoms may otherwise be determined from, for example, the lowest flow rate of hydrogen atoms at the temperature of the fuel cell stack 6 through thermodynamic equilibrium calculation. Alternatively, it is possible to find the critical flow rate YL of hydrogen atoms on the basis of an available profile of critical C:H:O ratios for coking and the temperature of the fuel cell stack 6 by using FIG. 2B or any such chart.

The controller 10, moreover, acquires the hydrogen consumption YC of the fuel cell stack 6 associated with internal leakage current, for example from the mass balance for $H_2O$ or $H_2$ as described above.

The controller 10 calculates, by subtracting the critical flow rate YL of hydrogen atoms and the hydrogen consumption YC of the fuel cell stack 6 associated with internal leakage current from the flow rate Y of hydrogen atoms, the maximum supply YM (=Y−YL−YC) of hydrogen atoms to power generation that can be reached without coking. From this maximum supply YM of hydrogen atoms, the controller 10 determines an upper limit lm of current output I from the fuel cell stack 6.

The controller 10 then keeps the current output I from the fuel cell stack 6 at or below the upper limit lm by, for example, controlling a power converter or any such component to which the current-out line 15 is connected. Considering the hydrogen consumption associated with internal leakage current in this way will limit the carbon deposition in the anode 6c, thereby reducing the loss of performance of the fuel cell stack 6.

The fuel cell systems 100 according to Embodiments 2 to 7 can also have an input 19. The structure, operation, and advantages of fuel cell systems 100 according to Embodiments 2 to 7 with an input 19 are similar to those in Embodiment 8 and are not described.

From the foregoing description, many improvements to and other embodiments of the present disclosure are apparent to those skilled in the art. The foregoing description should therefore be construed only as an illustration and is provided in order to teach those skilled in the art the best mode of carrying out the present disclosure. The details of the structures and/or functions set forth herein can be substantially changed without departing from the spirit of the present disclosure.

Fuel cell systems and methods for operating them according to the present disclosure are useful as, for example, fuel cell systems with further reduced coking and methods for operating them.

What is claimed is:

1. A fuel cell system comprising:
a fuel feeder that supplies fuel;
a fuel cell stack that generates power through an electrochemical reaction using air supplied to a cathode and a hydrogen-containing gas generated from the fuel and supplied to an anode;
a first temperature sensor that senses a cell temperature of the fuel cell stack;
an off-gas passage through which off-gas discharged from the anode passes;
a second temperature sensor that senses an off-gas temperature of the off-gas;
a pressure sensor that senses a pressure of the fuel; and
a controller, wherein:
the fuel cell stack comprises a membrane electrode assembly including an electrolyte membrane through which protons can pass, a cathode on a first side of the electrolyte membrane, and an anode on a second side of the electrolyte membrane, wherein any gas fed to the anode is defined as anode gas, and the controller includes a processing unit and a memory unit storing a program, wherein the program, when executed by the processing unit, causes the controller to:

cause the first temperature sensor to send the temperature of the fuel cell stack to the controller, cause the second temperature sensor to send the temperature of the off-gas to the controller, cause the pressure sensor to send the pressure of the fuel to the controller, calculate a flow rate of carbon atoms, a flow rate of hydrogen atoms, and a flow rate of oxygen atoms in the anode gas on the basis of information about composition of the fuel, supply of the fuel, and supply of steam, wherein the flow rate is defined as a total number of atoms for an element per unit time through an area in the anode, calculate a critical flow rate of hydrogen atoms of the fuel, where below the critical flow rate no coking occurs, wherein the critical flow rate of hydrogen atoms is determined by a fixed flow rate of carbon atoms, a fixed flow rate of oxygen atoms, a lower one of the fixed temperatures of the fuel cell stack and anode off-gas, and a preset pressure of the fuel through thermodynamic equilibrium calculation, and wherein the composition of the fuel is predetermined, the ratio of the supply of the fuel and the supply of the steam is constant, and thermodynamic equilibrium of the anode gas is calculated at descending flow rates of hydrogen atoms, and a lowest flow rate of hydrogen atoms that can be reached without coking is the critical flow rate of hydrogen atoms, calculate hydrogen consumption of the fuel cell stack associated with internal leakage current either by subtracting a theoretical amount of water in the absence of internal leakage current from a measured amount of water produced at the cathode, or by subtracting a theoretical amount of $H_2$ in the absence of internal leakage current from a measured amount of $H_2$ consumed at the anode, calculate a maximum supply of hydrogen atoms for power generation, at which no coking occurs, by subtracting the critical flow rate of hydrogen atoms and the hydrogen consumption of the fuel cell stack associated with internal leakage current from the flow rate of hydrogen atoms, calculate an upper limit of current output from the fuel cell stack based on the maximum supply of hydrogen atoms, and limit a supply of the fuel and/or steam to keep the current output from the fuel cell stack at or below the upper limit.

2. The fuel cell system according to claim 1, further comprising a reformer that reforms the fuel and generates the hydrogen-containing gas.

3. The fuel cell system according to claim 1, wherein:

the fuel cell system is one that gives an external load a supply of power from the fuel cell stack, and the program further causes the controller to increase the supply of the fuel when the controller determines that the supply of power from the fuel cell stack, which is based on predetermined performance characteristics of the fuel cell stack, will fail to meet a power requirement of the external load.

4. The fuel cell system according to claim 1, further comprising:

a water feeder that supplies water to the fuel cell stack; and an evaporator that evaporates the water supplied from the water feeder.

5. The fuel cell system according to claim 4, wherein:

the fuel cell system is one that gives an external load a supply of power from the fuel cell stack, and the program further causes the controller to increase at least one of the supply of the fuel and a supply of the water supplied from the water feeder when the controller determines that the supply of power from the fuel cell stack, which is based on predetermined performance characteristics of the fuel cell stack, will fail to meet a power requirement of the external load.

6. The fuel cell system according to claim 1, further comprising a steam feeder that supplies steam to the fuel cell stack.

7. The fuel cell system according to claim 6, wherein:

the fuel cell system is one that gives an external load a supply of power from the fuel cell stack, and the program further causes the controller to increase at least one of the supply of the fuel and a supply of the steam by the steam feeder to the fuel cell stack, when the controller determines that the supply of power from the fuel cell stack, which is based on predetermined performance characteristics of the fuel cell stack, will fail to meet a power requirement of the external load.

8. The fuel cell system according to claim 1, wherein the program further causes the controller to calculate the upper limit of current output from the fuel cell stack based on a lower temperature between the cell temperature of the fuel cell stack and the off-gas temperature of the off-gas.

9. The fuel cell system according to claim 1, wherein the fuel is hydrocarbon fuel.

10. The fuel cell system according to claim 9, wherein the hydrocarbon fuel is methane, or propane.

11. The fuel cell system according to claim 1, wherein the anode has a reforming capability.

12. The fuel cell system according to claim 1, wherein:

the fuel cell stack comprises an electrolyte which is a proton-conducting oxide, and through which holes or electrons pass, and the internal leakage current is a leakage current produced inside the electrolyte of the fuel cell stack by conduction of holes or electrons.

* * * * *